United States Patent
Stitt et al.

(10) Patent No.: US 6,409,981 B1
(45) Date of Patent: Jun. 25, 2002

(54) PROCESS FOR REMOVING CHLORINE FROM GAS STREAM

(75) Inventors: Edmund Hugh Stitt; Frederick Ernest Hancock, both of Cleveland (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/329,412

(22) Filed: Jun. 10, 1999

Related U.S. Application Data

(63) Continuation of application No. PCT/GB97/03175, filed on Nov. 19, 1997.
(60) Provisional application No. 60/045,013, filed on Apr. 25, 1997.

(51) Int. Cl.$^7$ ............................................... B01D 53/68
(52) U.S. Cl. ..................... 423/241; 423/240; 423/473; 423/499.4
(58) Field of Search .................. 423/241, 240, 423/473, 499.4

(56) References Cited

U.S. PATENT DOCUMENTS

| | | | |
|---|---|---|---|
| 4,297,333 A | * 10/1981 | Crawford et al. | 423/241 |
| RE32,392 E | * 4/1987 | Clark et al. | 502/159 |
| 4,992,408 A | * 2/1991 | Jackson | 502/328 |
| 5,039,429 A | * 8/1991 | Laundon et al. | 210/711 |
| 5,597,539 A | * 1/1997 | Fakley et al. | 423/210 |

FOREIGN PATENT DOCUMENTS

DE 2849498 * 5/1980 ............ 423/241

* cited by examiner

*Primary Examiner*—Ngoc-Yen Nguyen
(74) *Attorney, Agent, or Firm*—Pillsbury Winthrop LLP

(57) ABSTRACT

A process for the scrubbing of chlorine is scrubbed from a chlorine-containing gas using an aqueous feed liquor containing an excess of alkali to give an effluent liquor containing chloride and hypochlorite ions is disclosed. The effluent liquor is recycled as part or all of the aqueous feed liquor. For at least part of the time, at least part of the effluent liquor is passed through a fixed bed of a catalyst for the decomposition of hypochlorite ions whereby hypochlorite ions are decomposed to oxygen gas and chloride ions. The resultant catalyst-treated liquor is mixed with the remainder, if any, of the effluent liquor and recycled, optionally together with added fresh alkali solution, as the aqueous feed liquor. Part of the effluent liquor is optionally discharged as a purge stream before or after passage through catalyst bed. The process may be operated in a continuous mode or in a semi-continuous mode wherein a reservoir holding the liquor to be recycled is periodically discharged, preferably through the catalyst bed, and then recharged with fresh alkali solution. Alternatively two reservoirs may be employed with one supplying the aqueous feed liquor while the other is being discharged and replenished. In the latter case, the reservoir being discharged may have its liquor discharged through the catalyst bed.

10 Claims, 4 Drawing Sheets

PROCESS FOR REMOVING CHLORINE FROM GAS STREAM

This is a continuation under 35 U.S.C. Section 120 of International application Serial number PCT/GB97/03175 filed on Nov. 19, 1997 which application designates the US, which International application is based on U.S. Provisional application No. 60/045,013 filed on Apr. 28, 1997.

This invention relates to a scrubbing process and in particular to a process for scrubbing chlorine from a gaseous stream containing chlorine. An example of such a chlorine-containing gas stream is the vent gas from a plant producing chlorine: the vent gas often comprises oxygen, carbon dioxide and chlorine remaining as a result of incomplete condensation of the chlorine produced in the chlorine stream resulting from the electrolysis of brine. Other sources of chlorine-containing gas include reactor bleeds and off-gases resulting from the oxidation of chlorinated hydrocarbons; blow-down during chlorine tanker off-loading; pressure relief streams from chlorine processing plants; and primary brine dechlorination through air sparging. For environmental reasons it is desirable to remove essentially all of the chlorine from the gas stream before the latter is discharged to the atmosphere.

The chlorine removal is conventionally effected by scrubbing with an alkaline solution, often caustic soda solution, thereby forming a solution containing hypochlorite ions by the reaction $$Cl_2 + 2OH^- \rightarrow Cl^- + OCl^- + H_2O$$

Thus one hypochlorite ion is formed for each molecule of chlorine scrubbed from the gas. Generally the resulting hypochlorite-containing liquor is treated to decompose the hypochlorite ions into oxygen gas and chloride ions before discharge of the liquor, i.e. according to the reaction $$2OCl^- \rightarrow 2Cl^- + O_2$$

It has been proposed in U.S. Pat. No. 4,297,333 to effect such decomposition of hypochlorite ions in a liquor obtained by the caustic scrubbing of chlorine from a tail gas from an electrolytic chlorine plant by passage of the hypochlorite-containing liquor through a bed of a nickel oxide containing catalyst.

The scrubbing operation is usually operated in a cyclic process: thus the chlorine-containing gas is passed through a scrubber, e.g. a contactor, of which a packed tower is the most common, through which is flowing an aqueous scrubbing liquor generally counter-current to the flow of gas. The scrubbing liquor scrubs the chlorine from the gas giving an effluent liquor laden with chloride and hypochlorite ions. This effluent liquor leaving the scrubber, e.g. tower, is then recycled, usually via a holding tank, pump, and one or more heat exchangers, e.g. to the top of the tower.

The process may be operated as a continuous process, in which case, fresh alkali solution is added, continuously or periodically, before recycle, and part of the circulating liquor is removed, continuously or periodically, as a purge stream. This purge stream, a hypochlorite solution generally containing some excess of alkali, may be recycled, after treatment, for example as aforesaid, to decompose the hypochlorite therein, e.g., to a chlorine production plant. Alternatively the purge may be taken as a hypochlorite product stream or discharged to drain, generally after destruction of the hypochlorite therein.

Alternatively the process may be operated as a batch or semi-continuous process. In such processes, a suitable reservoir, e.g. a holding tank, is provided in the circulation loop and initially this reservoir is charged with fresh alkali. The scrubbing operation is operated until the alkali concentration drops to a predetermined level and then some or all of the liquor in the circulation loop is discharged and replenished with fresh alkali. In some cases the system may be designed such that the scrubbing operation may be halted or switched to another scrubber during such discharge and replenishment of the liquor.

Usually the circulation rate, rate of addition (if any) of fresh alkali, and amount of purge (if any) are such that the circulating liquor has a maximum sodium hypochlorite ion content of the order of 12–15% by weight, although it may be lower as a result of natural decomposition of the hypochlorite or the use of more dilute alkali solutions. Lower hypochlorite concentrations may result where other acid gases such as carbon dioxide, sulphur oxides, and hydrogen chloride are also present in the gas stream and these are co-absorbed with the chlorine.

Attempts to operate with higher hypochlorite concentrations tend to result in the decomposition of hypochlorite with the formation of chlorates $$3NaOCl \rightarrow 2NaCl + NaClO_3 \quad \text{Reaction 1}$$

The formation of chlorates is generally undesirable since they tend to be explosive and very toxic. Furthermore the rate of reaction 1 is strongly affected by the pH and temperature as well as the hypochlorite concentration. When the alkali is exhausted, i.e. the system is over chlorinated, the rate of chlorate formation is greatly accelerated. Under these conditions hypochlorous acid may be formed by the reaction $$NaOCl + Cl_2 + H_2O \rightarrow 2HOCl + NaCl \quad \text{Reaction 2}$$

The following reactions may then also occur $$2HOCl + NaOCl \rightarrow NaClO_3 + 2HCl \quad \text{Reaction 3}$$

$$HCl + NaOCl \rightarrow HOCl + NaCl \quad \text{Reaction 4}$$

The excess of chlorine thus favours reaction 2 and hence reaction 3. The rate of reaction 3 is much greater than that of reaction 1 and is strongly exothermic. The reaction thus has a runaway potential. This is normally avoided by providing for an excess of alkali and by cooling and/or by operating at a lower hypochlorite concentration.

In order to minimise the risk of chlorate formation while at the same time enable the system to cater for plant upsets producing an increased amount of chlorine in the gas being treated, it is desirable to operate at a lower circulating hypochlorite content. While this can be achieved by increasing the size of the holding tank and providing for significant increase in the circulation rate and amount of caustic soda added when such increases in the chlorine content occur, such modifications are not attractive economically. It is generally desirable to operate with a sufficient excess of caustic soda that increases in the chlorine content of the feed gas can be accommodated without providing for control of the amount of added caustic soda or of the circulation rate. In the case where changes in chlorine feed rate are due to emergency relief, these changes normally arise too fast for a control system to respond.

In the present invention this problem is overcome by providing for the catalytic decomposition of hypochlorite ions in at least part of the circulating liquor before it is recycled to the scrubber.

Accordingly the present invention provides a process for the scrubbing of chlorine from a chlorine-containing gas comprising contacting said gas with an aqueous feed liquor containing an excess of alkali over that required to react with the chlorine in the gas whereby said chlorine is scrubbed from the gas to provide an effluent liquor containing chloride and hypochlorite ions resulting from the reaction of said chlorine gas with said alkali, and passing at least part of said effluent liquor through a fixed bed of a catalyst for the decomposition of hypochlorite ions whereby hypochlorite ions in said at least part of the effluent liquor are decomposed to oxygen gas and chloride ions to give a treated liquor containing a decreased concentration of hypochlorite ions, characterised in that, for at least part of the time while said gas is being contacted with said aqueous feed liquor, at least part of said treated liquor is recycled as at least part of the aqueous feed liquor.

Thus in the invention, some of the hypochlorite produced from the reaction of chlorine with the alkali is decomposed to chloride ions and oxygen. As a result the standing concentration of hypochlorite in the circulating liquor can be decreased with consequent reduction in the risk of runaway reactions and chlorate formation. Further, as a result of the decreased risk of runaway reactions, it is possible to operate at higher temperatures, thereby reducing the need for cooling of the circulating liquor. Operation at higher temperatures is also beneficial as the rate of decomposition of hypochlorite is increased and so the volume of catalyst required may be relatively small.

Where the process is operated in a batch, or semi-continuous, mode, i.e. where the circulating liquor is periodically discharged and replenished, it may be desirable to effect the discharge by purging all the liquor through the catalyst bed. In this way the discharged liquor has passed through the bed and a substantial proportion of the hypochlorite in the liquor may thus be decomposed prior to disposal.

Where the process is operated continuously with a continuous or periodic purge, it is preferred that the purge stream is taken from the mixture of the treated liquor and the remainder, if any, of the effluent liquor. Conveniently the treated liquor and the remainder of the effluent liquor, if any, are fed to a holding tank or reservoir to which the solution of fresh alkali is added. It is also generally convenient that the purge is taken from the holding tank or from the recycle liquor taken from the holding tank before the latter is fed to the scrubber even though such a purge will inevitably contain some of the fresh alkali. Where the purge stream is recycled to a chlorine production plant, such alkali is not wasted. Where the purge stream is not recycled, but is discharged as a hypochlorite stream or to drain (generally after decomposition of the hypochlorite therein) there may be economic advantages in that the amount of alkali that is discharged in the purge stream may be decreased.

In an alternative process, two scrubbing loops may be employed: while one is on scrubbing duty, spent liquor is discharged from the other loop and then the latter is replenished. Thus the gas is fed alternately to the scrubber of the first loop, during which time aqueous liquor is discharged from the reservoir of the second loop and the reservoir of the second loop is replenished with fresh aqueous alkali solution, and to the scrubber of the second loop, during which time aqueous liquor is discharged from the reservoir of the first loop and the reservoir of the first loop is replenished with fresh aqueous alkali solution; and, for at least part of the period when the gas is being fed to the scrubber of the first loop and for at least part of the period when the gas is being fed to the scrubber of the second loop, at least part of the effluent liquor is passed through the catalyst bed, before or after passage through the reservoir of the respective loop, to give the treated liquor which is mixed with the remainder, if any, of the effluent liquor, and recycled as the aqueous feed liquor fed to the scrubber of the respective loop.

Instead of employing two separate scrubber units, each having its own scrubber and reservoir, a single scrubber unit having two reservoirs may be employed: while one reservoir is supplying the aqueous feed liquor, spent liquor is discharged from the other reservoir and then the latter is replenished. Thus the effluent liquor is recycled alternately via a first reservoir during which time aqueous liquor is discharged from a second reservoir which is then replenished with fresh aqueous alkali solution and via the second reservoir during which time aqueous liquor is discharged from the first reservoir which is then replenished with fresh aqueous alkali solution; and, for at least part of the period when the effluent liquor is recycled from the first reservoir and for at least part of the time when the effluent liquor is recycled from the second reservoir, at least part of the effluent liquor is passed through the catalyst bed, before or after passage through the respective reservoir, to give the treated liquor which is mixed with the remainder, if any, of the effluent liquor, and recycled as the aqueous feed liquor.

In the present invention some or all of the effluent liquor is passed through a fixed bed containing a hypochlorite decomposition catalyst. Unless it is desired that the hypochlorite content of the recycled aqueous liquor fed to the scrubber is maintained at a low level, e.g. 500–5000 ppm by weight, often it is only necessary for a relatively small proportion, for example 2 to 50%, of the effluent liquor to be fed to the catalyst bed. The destruction of hypochlorite ions in a catalyst bed is described in, inter alia, U.S. Pat. No. 5,387,349. In that reference it is indicated that it is necessary to employ a number of catalyst beds in series: however since in the present invention it is not necessary to obtain a catalyst bed effluent liquor having a very low level of hypochlorite ions, it is not necessary to avoid back mixing. As a consequence the apparatus employed may be simpler than that of that reference and a series of catalyst beds may not be needed.

The liquor being treated by the catalyst may be passed upwards through the catalyst bed, i.e. "upflow" where the liquor flow is co-current with the flow of evolved gas, or down through the catalyst bed, i.e. "downflow" where the liquor flow is counter-current to the flow of evolved gas.

The aforesaid U.S. Pat. No. 5,387,349 indicated that it was desirable to operate a downflow system under conditions such that the rate of disengagement of the oxygen produced by the decomposition of hypochlorite is less than 0.05 $m^3$ per second per $m^2$ of gas disengagement surface, i.e. cross sectional area of the catalyst bed. By using an upflow system, it is possible to operate the present invention at higher space velocities than was contemplated by that reference and so relatively small catalyst volumes may be employed. The volume of catalyst is usually such that the liquid hourly space velocity through the catalyst is in the range 0.1 to 1000 $h^{-1}$. An upflow system is desirable where the liquid flow velocity and/or the rate of evolution of gas is relatively large.

Since, in many cases, only a small proportion, e.g. 2 to 50%, of the effluent liquor need be passed through the catalyst, and high space velocities employed, the volume of catalyst can be relatively small.

For example for a plant having an effluent liquor rate of about 100 $m^3$/h, if only 5% of the effluent liquor is passed through the catalyst, the flow rate of liquor passing through the catalyst is 5 $m^3/h$. If the space velocity is 50 $h^{-1}$, the volume of catalyst required is only 100 litres. If the catalyst is disposed as a bed of depth 20 cm, the area of the bed cross section, i.e. the area available for gas disengagement is about 0.5 $m^2$. If a downflow arrangement is employed and problems of the gas evolution disrupting the liquor flow through the catalyst are to be avoided, the rate of gas evolution should not exceed 0.025 $m^3$ per second. This rate of gas evolution is given by the decomposition of about 600 kg/h of sodium hypochlorite and so the scrubber effluent liquor should contain no more than about 12% by weight of sodium hypochlorite. If the effluent liquor has a lower hypochlorite content, the space velocity could be increased, thereby enabling a smaller amount of catalyst to be used.

As indicated above, it is not normally necessary to employ conditions such that the treated liquor has a very low hypochlorite content: typically the treated liquor will have a hypochlorite content in the range 100 to 10000 ppm, i.e. about 0.1 to 10 g/l. Generally it is sufficient for the catalyst to effect decomposition of at least 80%, particularly 90 to 99%, of the hypochlorite in the liquor stream fed to the catalyst bed. The temperature of the liquor fed to the catalyst is typically in the range 10 to 90° C., particularly 20 to 60° C., and especially 30 to 50° C.

In another embodiment, the concentration of hypochlorite in the circulating liquor is maintained at a low level by passing a major proportion, or all, of the effluent liquor through the bed of hypochlorite decomposition catalyst.

The catalytic decomposition of hypochlorite ions by a fixed bed of catalyst is well known. Suitable catalysts include metal oxides such as nickel and/or cobalt oxide, often promoted with oxides of other metals such as copper, aluminium, iron, and magnesium, supported on, or bound together by a suitable binder into, shaped particles. Suitable support and binder materials capable of withstanding the alkaline conditions include certain plastics materials such as polyvinylidene fluoride, and oxidic materials such as magnesia, alpha-alumina and calcium aluminate cement. Particularly suitable catalysts are those described in EP 0 211 530, EP 0 276 044, EP 0 397 342 and WO 97/04870.

The invention is further described with reference to the accompanying drawings wherein FIG. 1 is a diagrammatic flowsheet of a process in accordance with the invention for operation in continuous mode;

FIG. 2 is a simplified flowsheet of the process employing two scrubber units operating in batch mode showing one scrubber unit on scrubbing duty and a second scrubber on stand-by;

FIG. 4 is a simplified flowsheet of the process employing one scrubbing unit having two reservoirs operating in batch mode with one reservoir in the scrubbing loop and a second reservoir on stand-by;

Figure 1:
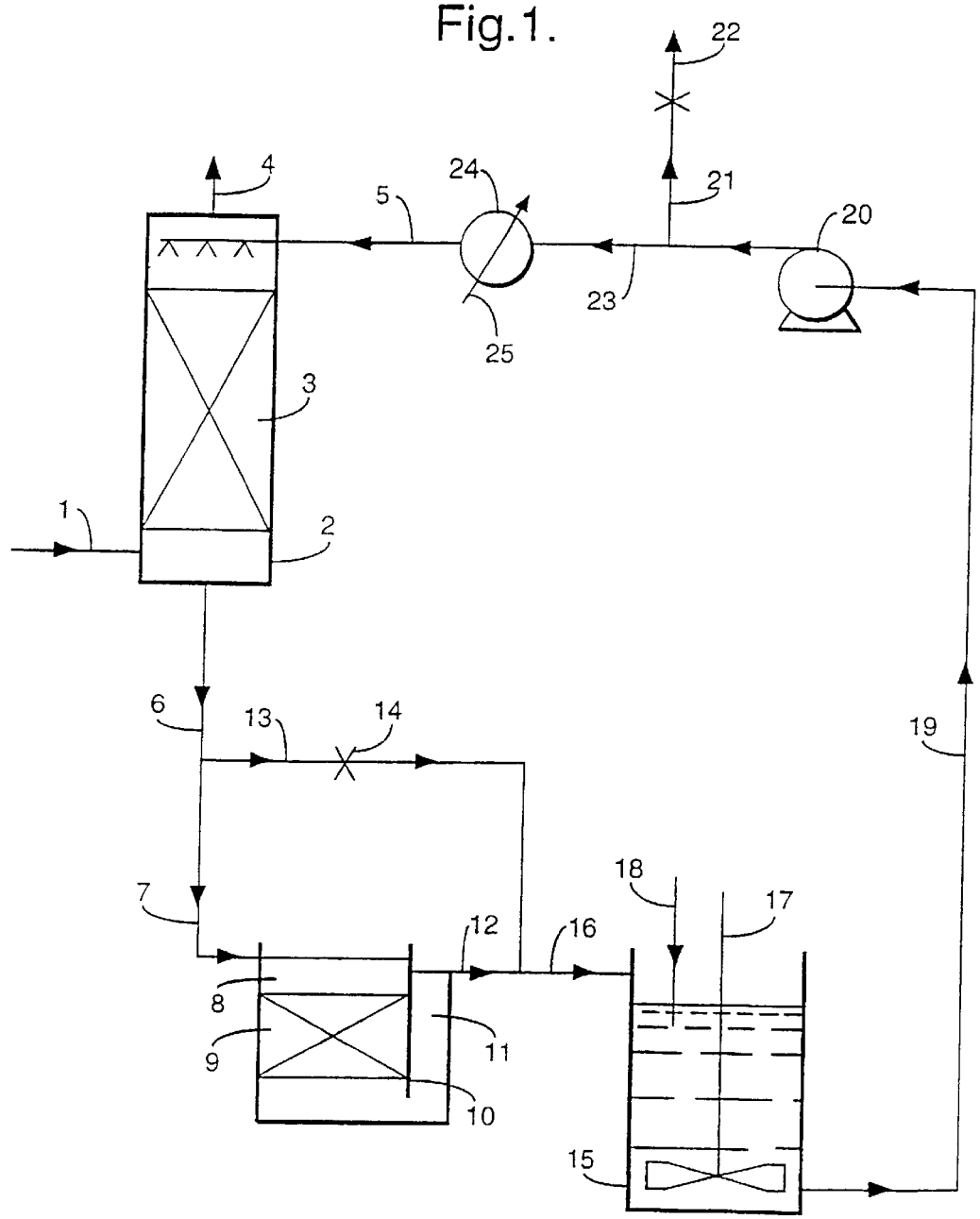

Referring to the FIG. 1, a chlorine-containing gas, e.g. vent gas from a chlorine production plant, is fed via line 1 to a column 2 containing a packing 3. The gas flows up through the column 2 and leaves the column at the upper end via line 4. An aqueous feed liquor containing alkali is fed to the upper end of the column via line 5. The liquor flows down through the packing 3 countercurrent to the flow of gas. On contact with the gas, the scrubbing liquor scrubs the chlorine from the gas forming chloride and hypochlorite ions. The laden scrubber effluent liquor is taken from the bottom of the column via line 6. Part of the scrubber effluent liquor is fed, under the action of gravity, via line 7 to a vessel 8 containing a fixed bed 9 of a catalyst for the decomposition of hypochlorite. The liquor fed to vessel 8 flows, under the action of gravity, down through bed 9 and then under a baffle 10, up a riser column 11, and then leaves vessel 8 via overflow 12. In this embodiment, the catalyst bed is thus operating in the downflow mode. It will be appreciated that an upflow bed could alternatively be employed.

The remainder of the scrubber effluent liquor bypasses the vessel 8 via a bypass line 13. A valve 14 is provided in bypass line 13 to control the proportion of the scrubber effluent liquor that flows through the bypass. The catalyst bed effluent liquor, in line 12, and the portion of the scrubber effluent liquor that bypasses vessel 8 via line 13 and valve 14, are united and fed to a holding tank 15 via line 16. The gas evolved from the catalyst bed 9 may be vented directly to the atmosphere or added to the gas fed to, or leaving, the scrubbing column 2. Alternatively the evolved gas can be fed to the holding tank 15 from which the gas may be vented. Tank 15 is provided with a stirrer 17 and a supply 18 of a solution of fresh alkali. In some cases stirrer 17 may be omitted as the circulating flow of the liquor may provide adequate mixing. The scrubber effluent liquor bypassing the catalyst bed, the catalyst bed effluent liquor, and fresh alkali are mixed in tank 15. A stream of liquor is withdrawn from tank 15 via line 19 by a circulating pump 20. Part of the liquor delivered from the pump is discharged as a purge stream via line 21. A valve 22 is disposed in line 21 to control the proportion of the liquor delivered from the pump 20 that is purged from the system. The remainder of the liquor delivered by the pump 20 is fed via line 23 and a heat exchanger 24 to line 5 to form the aqueous feed liquor fed to the column 2. The temperature of the circulating liquor is controlled by a suitable heat exchange medium flowing through the heat exchanger 24 via line 25.

Figure 2:
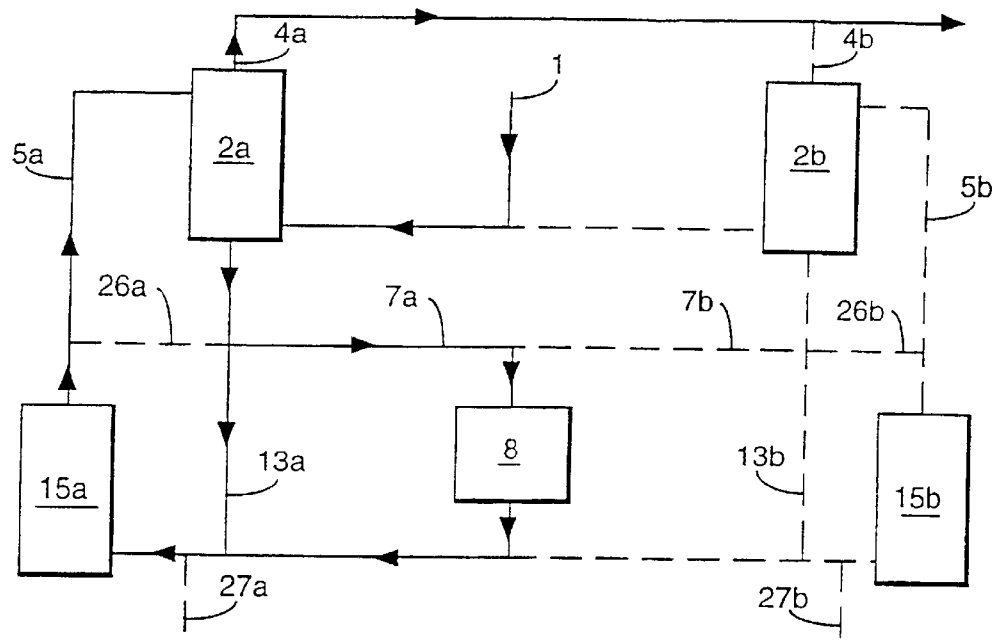
Figure 3:
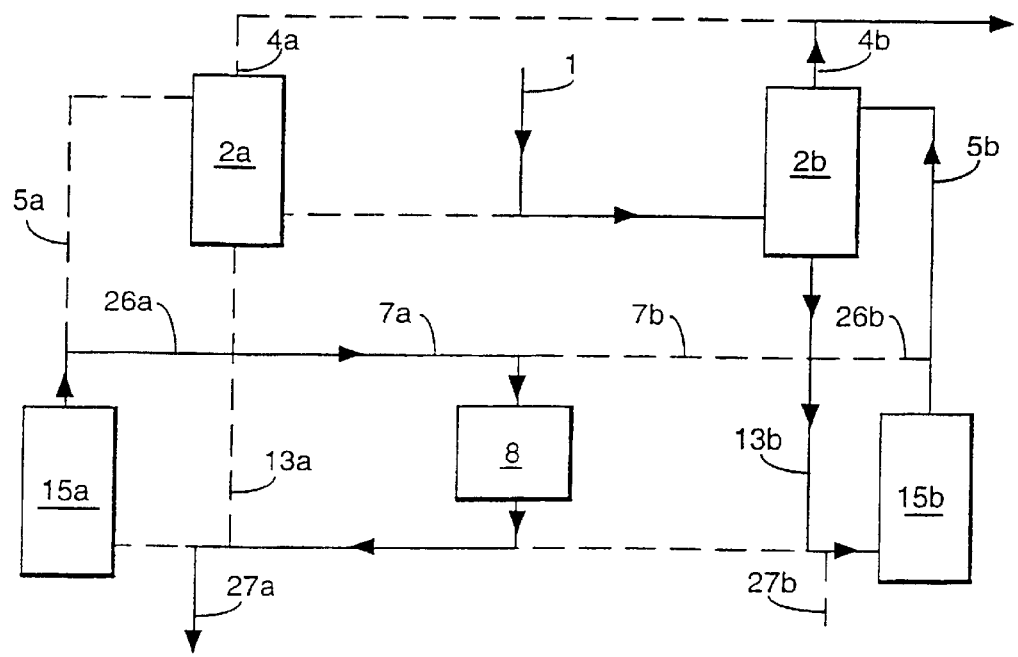
FIG. 3 is a view similar to FIG. 2 but showing the second scrubber unit on scrubbing duty and the first scrubber unit undergoing discharge.

In the embodiment of FIGS. 2 and 3, the components of FIG. 1 are shown simplified and the pumps and valves etc. are omitted for simplicity. Lines not in use are shown dotted.

In this embodiment, two scrubbing loops are shown, with a single catalyst bed unit. In FIG. 2, the first loop is on scrubbing duty: thus the gas to be scrubbed is fed via line 1 to the first scrubbing column 2a to which the aqueous liquor is fed via line 5a from a holding tank 15a. The laden scrubber effluent liquor from the bottom of tower 2a is fed via line 7a to the catalyst bed 8 from whence it returns to the holding tank 15a. Part of the scrubber effluent liquor may bypass the catalyst bed via line 13a if desired. The second scrubbing loop is idle, i.e. on stand-by duty.

When the liquor in the first scrubbing loop requires replenishment, the second scrubbing loop is brought into operation as shown in FIG. 3. Thus the liquor from the second holding tank 15b is fed to the top of the second scrubbing tower 2b, and the flow of gas switched from tower 2a to tower 2b. The laden scrubber effluent liquor from tower 2b is returned to holding tank 15b via bypass line 13b. While scrubbing is occurring in the second scrubbing loop, the contents of holding tank 15a are discharged via a bypass line 26a and line 7a through the catalyst bed 8 and thence to drain via line 27a. When sufficient spent liquor has been discharged from holding tank 15a, the flow through bypass 26a is stopped and tank 15a refilled with fresh aqueous alkali solution via a suitable line (not shown). When the discharge of holding tank 15a has been completed, the flow of laden scrubber effluent liquor from tower 2b through line 7b, catalyst bed 8 and thence return to holding tank 15b can be commenced, and the flow of the laden scrubber effluent liquor through bypass line 13b can be decreased or stopped. When replenishment of holding tank 15a is completed, the first scrubbing loop is thus on stand-by duty in readiness for the discharge and replenishment of holding tank 15b.

Figure 4:
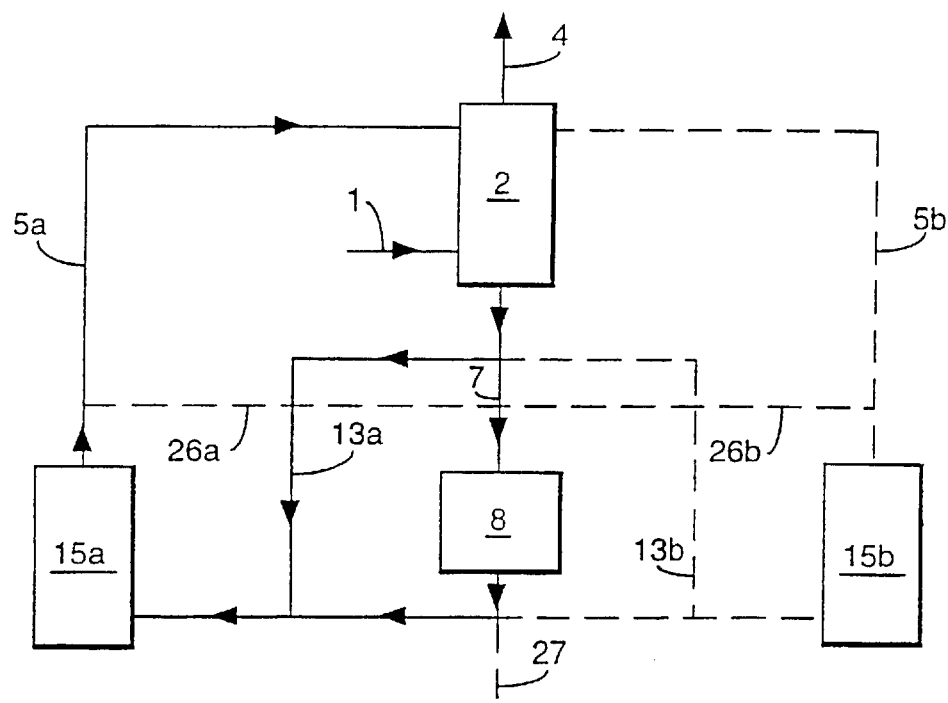
Figure 5:
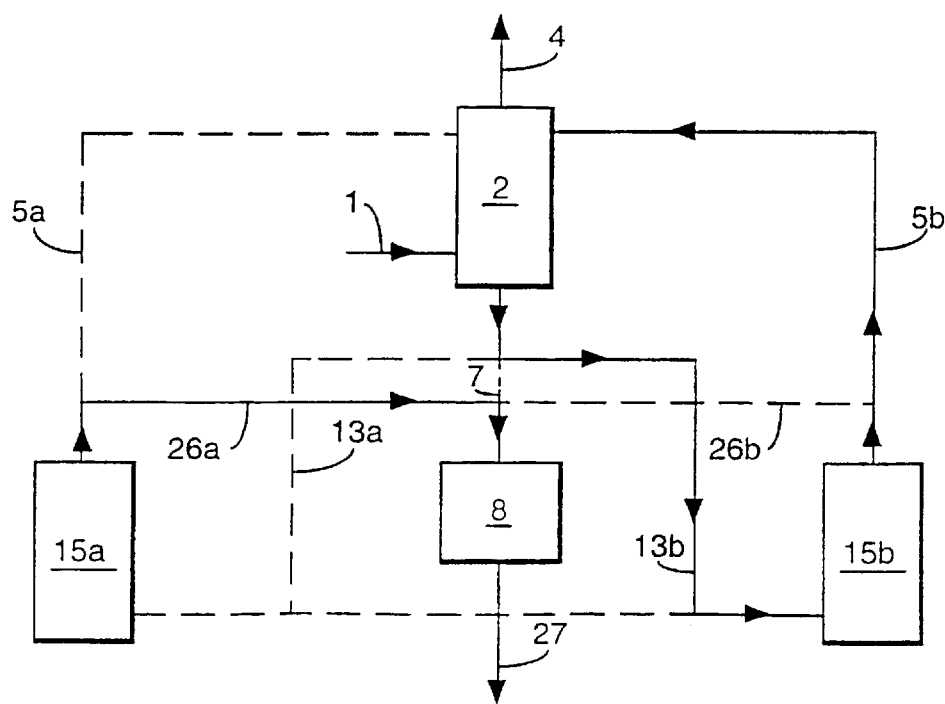
FIG. 5 is a view similar to FIG. 4 but showing the second reservoir in the scrubbing loop and the first reservoir undergoing discharge.

In the embodiment of FIGS. 4 and 5 the operation is similar to that of the embodiment of FIGS. 2 and 3 but instead of there being two separate scrubber units, each with its own loop, a single scrubber is employed with two reservoirs or holding tanks 15a and 15b.

Figure 6:
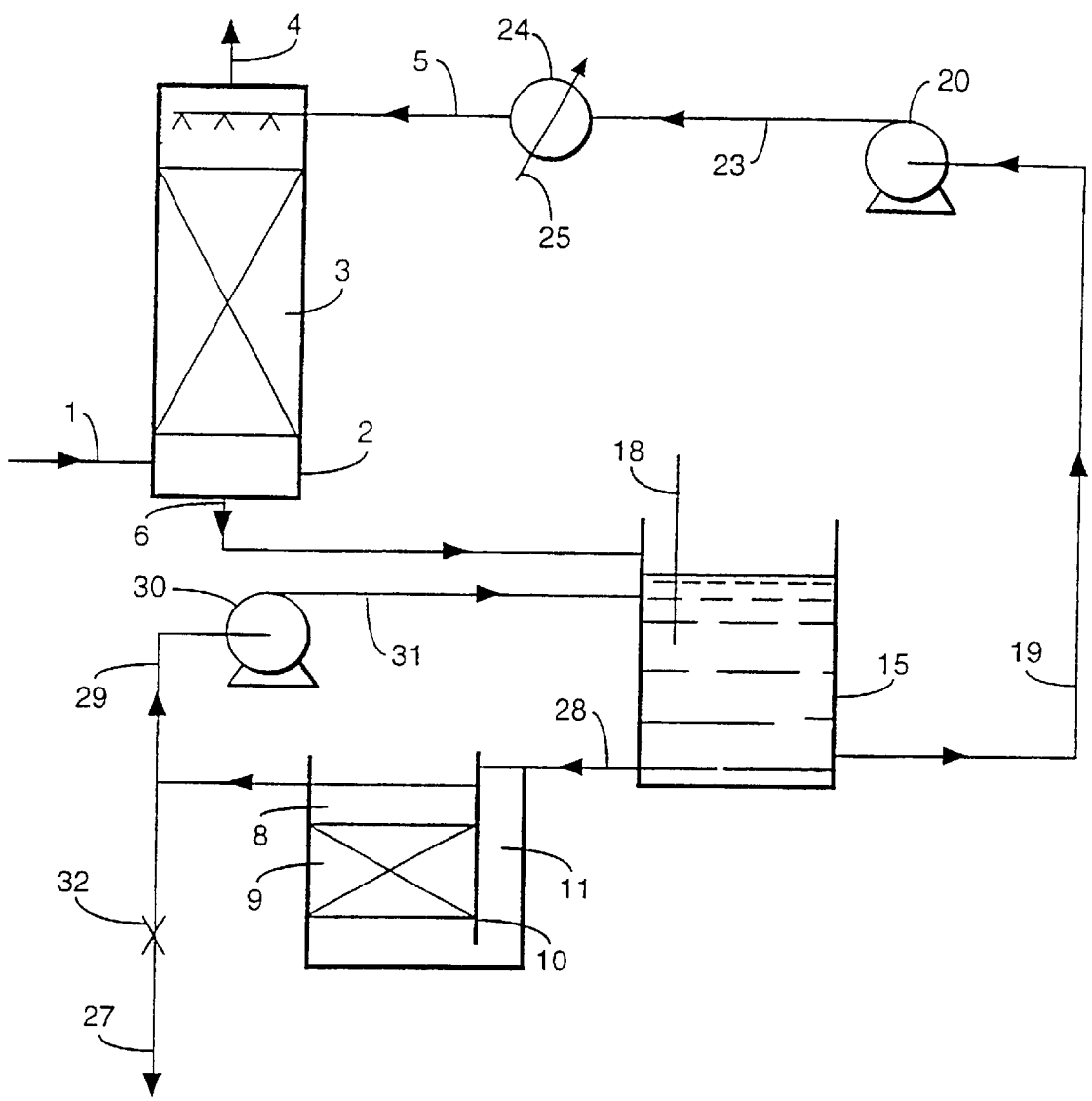
FIG. 6 is a view similar to FIG. 1 of the flowsheet for a process for operation in semi-continuous mode.

In the embodiment of FIG. 6, an arrangement similar to that of FIG. 1 is employed. However, the scrubber effluent liquor is fed directly via line 6 to the holding tank 15. A stream of the scrubber effluent liquor is taken from the lower end of the holding tank via line 28 and fed to the catalyst bed. In this embodiment, the catalyst bed is shown in the upflow mode: thus the liquor flows down the channel 11 between the wall of the vessel 8 and the baffle 10 and then up through the catalyst bed 9. The catalyst bed effluent liquor is fed, via line 29 to a recirculation pump 30 and thence returned to the holding tank via line 31. Instead of providing the purge via line 21 from pump 20, a purge stream 27 is provided from the catalyst bed effluent. Flow of this purge stream is controlled by valve 32.

The system of FIG. 4 is operated in a semi-continuous mode. Thus at the start of a cycle, the holding tank is charged with fresh alkali solution, e.g. caustic soda solution, via line 18. For a period of time the system is operated as described above with part of the liquor from tank 15 being fed through catalyst bed 9 and returned to holding tank 15 via line 31. During this period, valve 32 is closed. When the concentration of free alkali in the holding tank has dropped to a predetermined level, valve 32 is opened and pump 30 stopped so that all the catalyst bed effluent liquor is discharged from the system. When the inventory of liquor in the holding tank 15 has fallen to a predetermined level, the valve 32 is closed, pump 30 re-started, and fresh aqueous alkali solution added through line 18 until the holding tank is recharged. During the discharge and re-charging of holding tank 15, the flow of gas through scrubber 3, and the flow of liquor through lines 19, 23, 5 and 6 is continued so that absorption of the chlorine from the feed gas is not interrupted.

The invention is illustrated by the following calculated examples.

EXAMPLE 1

In this example the flowsheet of FIG. 1 is employed. The aqueous feed liquor is fed to the scrubber at the rate of about 8 te/h and Is used to treat a chlorine-containing gas stream fed to the scrubber 2. A portion (9%) of the liquor delivered by pump 20 is taken as the purge. A portion (5%) of the scrubber effluent liquor is fed via line 7 to a bed of a nickel oxide-containing hypochlorite decomposition catalyst. A solution containing 300 g/l of caustic soda is fed via line 18 at a rate of 0.68 te/h. Assuming that 99% of the hypochlorite in the feed to the catalyst bed is decomposed, the steady state flow rates and concentrations of the liquor components for chlorine feed rates of 100 and 120 kg/h (i.e. 0.10 and 0.12 te/h respectively) are as set out in the following table.

| | Flow rate | Concentration (wt %) | | |
|---|---|---|---|---|
| | (te/h) | NaOCl | NaOH | NaCl |
| Chlorine in gas 1 | 0.10 | — | — | — |
| Scrubber feed 5 | 7.76 | 8.66 | 5.64 | 14.67 |
| Scrubber effluent 6 | 7.86 | 9.88 | 4.14 | 15.53 |
| Catalyst effluent 12 | 0.38 | 0.10 | 4.23 | 23.71 |
| Purge 21 | 0.77 | 8.66 | 5.64 | 14.67 |
| Chlorine in gas 1 | 0.12 | — | — | — |
| Scrubber feed 5 | 7.95 | 10.15 | 2.64 | 17.19 |
| Scrubber effluent 6 | 8.07 | 11.56 | 0.93 | 18.16 |
| Catalyst effluent 12 | 0.39 | 0.12 | 0.95 | 27.83 |
| Purge 21 | 0.79 | 10.15 | 2.64 | 17.19 |

It is seen that a 20% increase in the chlorine feed rate causes the hypochlorite content of, the recycle liquor to increase from 8.66% to 10.15%.

By way of comparison if the catalyst bed is omitted, the flow rates and concentrations are calculated to be as shown in the following table.

| | Flow rate | Concentration (wt %) | | |
|---|---|---|---|---|
| | (te/h) | NaOCl | NaOH | NaCl |
| Chlorine in gas 1 | 0.10 | — | — | — |
| Scrubber feed 5 | 7.85 | 13.52 | 5.58 | 10.62 |
| Scrubber effluent 6 | 7.95 | 14.67 | 4.09 | 11.52 |
| Purge 21 | 0.78 | 13.52 | 5.58 | 10.62 |
| Chlorine in gas 1 | 0.12 | — | — | — |
| Scrubber feed 5 | 8.05 | 15.82 | 2.61 | 12.42 |
| Scrubber effluent 6 | 8.17 | 17.13 | 0.92 | 13.45 |
| Purge 21 | 0.80 | 15.82 | 2.61 | 12.42 |

In the absence of the catalyst, it is seen that the 20% increase in the chlorine feed rate causes the hypochlorite concentration in the recycle liquor to increase from 13.5% to 15.8%.

EXAMPLES 2–6

In these examples, the arrangement of FIG. 1 is employed. The aqueous feed liquor is fed to the scrubber at the rate of about 180 te/h and is used to treat a chlorine-containing gas stream fed to the scrubber 2. The gas feed rate is such that 360 kg/h of chlorine is fed to the scrubber. Caustic soda solution (containing 20% by weight of sodium hydroxide) is continuously added via line 18 at a rate of 1.8 te of solution per hour, and an appropriate amount of liquor is purged from the system via line 22 to maintain the liquid inventory constant. The following table shows the effect of various volumes of hypochlorite decomposition catalyst, and various proportions of the scrubber effluent liquor fed to the catalyst, on the hypochlorite concentration of the aqueous feed liquor fed to the scrubber, assuming that the concentration of caustic soda in the circulating liquor is maintained at about 4.6% by weight and the catalyst bed is operated at 40° C.

| Example | 2 | 3 | 4 | 5 | 6 |
|---|---|---|---|---|---|
| Catalyst volume (m$^3$) | 0.80 | 0.96 | 1.80 | 5.00 | 5.00 |
| Proportion of scrubber effluent fed to catalyst (%) | 25 | 10 | 25 | 10.4 | 50 |
| Hypochlorite concentration (wt %) | 3.23 | 3.23 | 1.69 | 1.69 | 0.60 |

By way of comparison, if the catalyst is omitted, the hypochlorite concentration is 12.25% by weight.

EXAMPLES 7–10

In these examples, a semi-continuous system of the type shown in FIG. 6 is employed. The aqueous feed liquor is fed to the scrubber at the rate of 20 m³/h and is used to treat a chlorine-containing gas stream fed to the scrubber 2. The gas feed rate is such that 18 kg/h of chlorine is fed to the scrubber. The volume of the holding tank 15 is 5.5 m³.

The operating cycle, starting from the completion of recharging of the holding tank 15 (at which stage the caustic soda content of the liquor in the holding tank is about 14.4% by weight), is 24 hours operation followed by discharge of approximately 80% of the holding tank contents, via the catalyst bed, and then re-charging the holding tank with fresh aqueous caustic soda solution. The time taken for discharge depends on the rate of feed to the catalyst bed: this is assumed to be constant throughout the operating cycle. For simplicity it is assumed that the time for re-charging is the same as the time taken for discharging.

During the 24 period of operation before commencement of the discharge, the caustic soda concentration of the liquor in the holding tank steadily falls as the chlorine is absorbed with the formation of sodium hypochlorite and sodium chloride. However, because of the decomposition of the hypochlorite in the catalyst bed, the hypochlorite concentration rises only slowly and then levels out. At the end of the 24 hour period, discharge of 4 m³ of the holding tank contents is commenced by opening valve 32 and stopping pump 30. At this stage the caustic soda content of the liquor in the holding tank has fallen to about 6.9% by weight. During the discharge period the caustic soda concentration continues to fall since absorption of chlorine is still proceeding. Also, since the catalyst bed effluent liquor is no longer being recycled to the holding tank, the hypochlorite concentration of the holding tank contents, and hence of the aqueous feed liquor fed to the scrubber rises. When the discharge of 4 m³ of the holding tank contents has been completed, valve 32 is closed and pump 30 re-started to re-commence recycle of the catalyst bed effluent liquor. At the same time the charging of fresh aqueous caustic soda solution (containing 20% by weight of sodium hydroxide) via line 18 to the holding tank is commenced.

The following table shows the effect of various volumes of hypochlorite decomposition catalyst, and rates of feed to the catalyst bed, on the average and maximum hypochlorite concentration of the liquor fed to the scrubber, and on the average hypochlorite concentration of the effluent from the catalyst bed during the discharge stage of the cycle.

By way of comparison, the table also quotes the data (Comp) for the case where there is no catalyst, i.e. in this case liquor only flows through line 28 (directly to purge line 27) during the discharge stage.

In Examples 7, 8 and the comparison (no catalyst) the total cycle was 32 hours, i.e. 4 hours discharge, 4 hours re-charge, and then 24 hours operation before commencement of the next discharge. In Example 9, the discharge and recharging times were each 2 hours, giving a total cycle time of 28 hours.

| Example | | 7 | 8 | 9 | Comp |
|---|---|---|---|---|---|
| catalyst volume (m³) | | 0.10 | 0.25 | 0.25 | 0 |
| line 28 flow rate (m³/h) | | 1 | 1 | 2 | 1 |
| hypochlorite concentration (% by weight) | scrubber feed (avg.) | 2.4 | 1.7 | 1.1 | 9.4 |
| | scrubber feed (max.) | 4.1 | 3.4 | 2.0 | 13.4 |
| | line 27 (avg. during discharge) | 1.2 | 0.2 | 0.4 | 13.4 |

What is claimed is:

1. A process for the scrubbing of chlorine from a chlorine-containing gas comprising contacting said gas with an aqueous feed liquor containing an excess of alkali over that required to react with the chlorine in the gas whereby said chlorine is scrubbed from the gas to provide an effluent liquor containing chloride and hypochlorite ions resulting from the reaction of said chlorine gas with said alkali, and passing at least part of said effluent liquor through a fixed bed of a catalyst for the decomposition of hypochlorite ions whereby hypochlorite ions in said at least part of the effluent liquor are decomposed to oxygen gas and chloride ions to give a treated liquor containing a decreased concentration of hypochlorite ions, characterised in that, for at least part of the time while said gas is being contacted with said aqueous feed liquor, at least part of said treated liquor is recycled as at least part of the aqueous feed liquor.

2. A process according to claim 1, wherein the process is operated continuously with fresh alkali solution being added, continuously or intermittently, to the aqueous feed liquor, and continuously or intermittently discharging part of the effluent liquor, before or after passage through the catalyst bed, as a purge stream.

3. A process according to claim 2 wherein the purge stream is taken from the mixture of the treated liquor and the remainder, if any, of the effluent liquor.

4. A process according to claim 1 wherein the aqueous feed liquor is taken from a reservoir, to which the effluent liquor is returned, and periodically discharging part of the contents of the reservoir as a purge and then replenishing the reservoir with fresh aqueous alkali solution.

5. A process according to claim 4 wherein the effluent liquor is recycled alternatively via a first reservoir and a second reservoir such that the effluent liquor is recycled
   (i) via the first reservoir while a discharging part of the contents of the second reservoir which is then replenished with fresh aqueous alkali solution, or
   (ii) via the second reservoir while discharging part of the contents of the first reservoir which is then replenished with fresh aqueous alkali solution, and
      wherein, for at least part of the period when the effluent liquor is recycled from the first reservoir and for at least part of the time when the effluent liquor is recycled from the second reservoir, passing at least part of the effluent liquor, before or after passage through the respective reservoir, through the catalyst bed to give the treated liquor which is mixed with the remainder, if any, of said effluent liquor, and recycled as the aqueous feed liquor.

6. A process according to claim 5 wherein two scrubber loops are employed, each loop having a scrubber and a reservoir, and alternately
   (i) feeding the gas to the scrubber of the first loop, discharging part of the contents of the reservoir of the second loop and replenishing the reservoir of the second loop with fresh aqueous alkali solution, and (ii) feeding said gas to the scrubber of the second loop, discharging the part of the contents of the reservoir of the first loop, and replenishing said reservoir of the first loop with fresh aqueous alkali solution; and for at least part of the period when the gas is being fed to the scrubber of the first loop and for at least part of the period when the gas is being fed to the scrubber of the second loop, passing at least part of the effluent liquor, before or after passage through the reservoir of the respective loop, through the catalyst bed to give the treated liquor which is mixed with the remainder, if any, of said effluent liquor, and recycled as the aqueous feed liquor fed to the scrubber of the respective loop.

7. A process according to claim 4 wherein the reservoir contents are discharged through the catalyst bed.

8. A process according to claim 7 wherein, during the period when aqueous liquor is being discharged from the reservoir, the effluent liquor is not passed through the catalyst bed.

9. A process according to claim 1 wherein, during the period when effluent liquor is fed to the catalyst bed, 2 to 50% of the effluent liquor is fed to the catalyst bed.

10. A process according to claim 1 wherein the liquid hourly space velocity through the catalyst is in the range 0.1 to 1000 $h^{-1}$.

* * * * *